United States Patent
Ando et al.

(10) Patent No.: US 12,304,860 B2
(45) Date of Patent: May 20, 2025

(54) THICK FILM RESISTOR PASTE, THICK FILM RESISTOR, AND ELECTRONIC COMPONENT

(71) Applicant: SUMITOMO METAL MINING CO., LTD., Tokyo (JP)

(72) Inventors: Masaki Ando, Tokyo (JP); Takahito Nagano, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 88 days.

(21) Appl. No.: 17/921,736

(22) PCT Filed: Apr. 30, 2021

(86) PCT No.: PCT/JP2021/017300
§ 371 (c)(1),
(2) Date: Oct. 27, 2022

(87) PCT Pub. No.: WO2021/221174
PCT Pub. Date: Nov. 4, 2021

(65) Prior Publication Data
US 2023/0167011 A1    Jun. 1, 2023

(30) Foreign Application Priority Data
May 1, 2020  (JP) ................. 2020-081115

(51) Int. Cl.
| | |
|---|---|
| C03C 4/14 | (2006.01) |
| C03C 8/10 | (2006.01) |
| C03C 8/16 | (2006.01) |
| H01B 1/22 | (2006.01) |
| H01C 7/00 | (2006.01) |

(52) U.S. Cl.
CPC .............. *C03C 4/14* (2013.01); *C03C 8/10* (2013.01); *C03C 8/16* (2013.01); *H01B 1/22* (2013.01); *H01C 7/003* (2013.01)

(58) Field of Classification Search
CPC .... H01B 1/22; C03C 8/10; C03C 8/16; C03C 8/18; C03C 3/108; H01C 7/003
USPC ............................................. 252/514, 519.3
See application file for complete search history.

(56) References Cited

U.S. PATENT DOCUMENTS

| | | | |
|---|---|---|---|
| 6,406,646 B1 * | 6/2002 | Lee ................. | H01C 17/06553 252/514 |
| 2004/0046154 A1 * | 3/2004 | McVicker ................. | C03C 8/16 252/514 |
| 2013/0344342 A1 * | 12/2013 | Ogata ...................... | H01B 1/22 428/688 |
| 2016/0369111 A1 * | 12/2016 | Moyer ..................... | C09D 5/24 |

FOREIGN PATENT DOCUMENTS

| | | | |
|---|---|---|---|
| JP | S52-054195 A | | 5/1977 |
| JP | S53-100496 A | | 9/1978 |
| JP | S6221201 A | * | 1/1987 |
| JP | H04-320003 A | | 11/1992 |
| JP | 4706703 B2 | | 6/2011 |
| JP | 2013-053030 A | | 3/2013 |
| JP | 2019-062178 A | | 4/2019 |
| WO | WO-2012176696 A1 | * | 12/2012 ........... C01G 55/004 |

OTHER PUBLICATIONS

International Search Report dated Jul. 13, 2021, issued in counterpart International Application No. PCT/JP2021/017300.

* cited by examiner

*Primary Examiner* — Tri V Nguyen
(74) *Attorney, Agent, or Firm* — WHDA, LLP (57) ABSTRACT

The thick film resistor paste for a resistor has no abnormalities of cracks in appearance and sufficient surge resistance, especially for low resistance, while using lead borosilicate glass. The thick film resistor paste comprises a silver powder or a palladium powder, or a mixture of both of the silver powder and the palladium powder, a ruthenium-oxide-containing glass powder and an organic vehicle, the ruthenium-oxide-containing glass powder comprises 10 to 60 mass % of ruthenium oxide, a glass composition of the ruthenium-oxide-containing glass powder comprises 3 to 60 mass % of silicon oxide, 30 to 90 mass % of lead oxide, 5 to 50 mass % of boron oxide relative to 100 mass % of glass components, and, a combined amount of silicon oxide, lead oxide and boron oxide by mass % is 50 mass % or more relative to 100 mass % of the glass components.

6 Claims, 2 Drawing Sheets

THICK FILM RESISTOR PASTE, THICK FILM RESISTOR, AND ELECTRONIC COMPONENT

TECHNICAL FIELD

The present invention relates to a thick film resistor paste, and more particularly to a thick film resistor paste, a thick film resistor using such thick film resistor paste and an electronic component with such thick film resistor. The thick film resistor contains a glass powder containing ruthenium oxide and a silver powder or a palladium powder, or both powders; is capable of forming a thick film resistor particularly with no cracks and with excellent surge resistance; and is particularly used for low resistance.

BACKGROUND ART

A thick film resistor paste is generally comprised of a conductive powder, a glass powder, and an organic vehicle for making them into a paste suitable for printing. By printing the thick film resistor paste in an arbitrary pattern and sintering a glass at a high temperature of usually 800 to 1000 degrees Celsius, the thick film resistor paste is used as a thick film resistor for electronic components such as thick film chip resistors. Ruthenium oxide powder and lead ruthenate powder are widely used as conductive powders, because the resistance value can be changed gradually by adjusting the mixing ratio with the glass powder.

For example, Patent Document 1 describes a technique of a thick film resistor formed using a resistor paste, made by adding a mixture using mullite as an inorganic particle, lead borosilicate glass as a glass particle, and ruthenium dioxide as a conductive particle, to a vehicle using ethyl cellulose as a binder and toluene and alcohol as a solvent.

In addition, appearing low resistance value of less than 100 ohm, the conductive particle further comprises a silver powder or a palladium powder, or both of the silver powder and the palladium powder as a conductive particle.

In addition, Patent Document 2 describes a technique of a thick film resistor paste, wherein a thick film resistor composition containing a ruthenium oxide-based conductive powder and a glass frit further contains a silver powder and an organic vehicle being added.

In recent years, the miniaturization of electronic components such as thick film chip resistors have progressed, and thick film resistors are required to have improved electrical characteristics. In particular, thick film resistors with no cracks in appearance and with excellent voltage resistance such as surge resistance are required. When an instantaneous high voltage (surge voltage) is applied to a thick film resistor, it usually shows a negative resistance value change, but the smaller amount of change in the resistance value is desirable. Such negative resistance value change is considered to be an effect of heat generation when a voltage is applied. In conventional thick film resistor pastes, glass powders are bonded to each other during sintering, but softening of the glass powders is limited only to the surface layer. Therefore, a dielectric layer corresponding to the glass particle diameter exists in the thick film resistor after the thick film resistor paste is sintered. The conductive powder, distributed around the dielectric layer, makes the thick film resistor conductive. When forming a resistor with low resistance, a ruthenium oxide powder is preferably used as a conductive powder. When making the resistance value much lower, a silver powder or a palladium powder, or a mixture powder of both the silver powder and the palladium powder are further contained. Because ruthenium oxide is not sinterable, a resistor with low resistance specifically containing a large amount of ruthenium oxide is likely to generate cracks.

Patent document 3 describes a technique that may reduce cracks, wherein a resistor paste, containing a carbon-based conductive powder and a substituted monovalent phenolic resin obtained by the condensation reaction of p-t-butylphenol and formaldehyde, further contains a polycarboxylic acid dispersant.

PRIOR ART DOCUMENTS

Patent Documents

Patent Document 1: JP Patent Laid-Open No. H04-320003
Patent Document 2: JP Patent Laid-Open No. 2019-062178
Patent Document 3: JP Patent No. 4706703

SUMMARY OF THE INVENTION

Problems to be Solved by the Invention

However, thick film resistors for electronic components that have become smaller in size in recent years are required to have a thick film resister paste wherein a resistor is hard to have cracks even if a glass is used as an insulating material for heat resistance at higher temperatures.

The object of the present invention is to provide a thick film resistor paste having no abnormalities of cracks in appearance and sufficient surge resistance, especially for low resistance, while using lead borosilicate glass, a thick film resistor using such thick film resistor paste, and electronic components equipped with such thick film resistor paste.

Measures to Solve the Problems

As a result of various studies, a thick film resistor formed by a thick film resistor paste using a ruthenium-oxide-containing glass powder composed of a specific composition have lower crack generation rate than conventional products. And the present invention is derived.

That is, the thick film resistor paste according to the present invention comprises a ruthenium-oxide-containing glass powder, an organic vehicle, and a silver powder or a palladium powder, or a mixture powder of both the silver powder and the palladium powder, wherein the ruthenium-oxide-containing glass powder comprises 10 mass % or more and 60 mass % or less of ruthenium oxide, wherein a glass composition of the ruthenium-oxide-containing glass powder comprises 3 mass % or more and 60 mass % or less of silicon oxide, 30 mass % or more and 90 mass % or less of lead oxide, and 5 mass % or more and 50 mass % or less of boron oxide relative to 100 mass % of glass components, and wherein a combined amount of silicon oxide, lead oxide and boron oxide by mass % is 50 mass % or more relative to 100 mass % of the glass components.

Further, in the thick film resistor paste of the present invention, the average particle diameter of the ruthenium-oxide-containing glass powder may preferably be 5 micrometers or less.

Further, the thick film resistor according to the present invention is characterized to comprise a sintered body of the thick film resistor paste of any embodiments of the above present invention.

Further, the electronic component for low resistance according to the present invention is characterized to comprise the thick film resistor of the above present invention.

Effect of the Invention

The present invention can provide a thick film resistor paste having sufficient surge resistance, making crack generation rate on the surface of resistor lower than those of conventional ones, a thick film resistor using the thick film resistor paste, and an electronic component provided with the thick film resistor.

MODE FOR CARRYING OUT THE INVENTION

Hereinafter, the embodiments of the present invention will be described. The present invention is not limited to the following embodiments, but various variations and substitutions can be made to the following embodiments within the scope of the present invention.

The thick film resistor paste of the present embodiment contains a silver powder or a palladium powder, or a mixture powder of both the silver powder and the palladium powder, a ruthenium-oxide-containing glass powder and an organic vehicle. Hereinafter, each component of the thick film resistor paste will be described in detail.

(Conductive Substance)

For the thick film resistor pastes of the present invention, silver or palladium, or a mixture of both silver and palladium, and ruthenium oxide are used as conductive substances. A general thick film resistor paste has a structure that contains a conductive substance and glass in respective powder form. In the thick film resistor paste of the present invention, however, a ruthenium oxide powder as the conductive substance is not used alone. The thick film resistor paste of the present invention has a structure using a ruthenium-oxide-containing glass powder that is obtained by crushing a ruthenium-oxide-containing glass produced by using ruthenium oxide and glass.

The particle diameter of ruthenium oxide forming the ruthenium-oxide-containing glass powder is not specifically limited, but a particle diameter that has a specific surface area of 5 m$^2$/g or more is preferably used. If the specific surface area is less than 5 m$^2$/g, the particle diameter of ruthenium oxide becomes too large, and may reduce the uniformity of the conductive area in the thick film resistor and reduce the surge resistance.

In addition, the thick film resistor paste of the present invention contains a silver powder or a palladium powder, or a mixture powder of both the silver powder and the palladium powder, in order to efficiently produce low resistance values.

The particle diameters of the silver powder and the palladium powder are not particularly limited, but for use in miniaturized electronic components, it is preferable to use the silver powder with an average particle diameter of one micrometer or more and 10 micrometers or less, and to use the palladium powder with an average particle diameter of 0.2 micrometers or more and one micrometer or less. The type of silver powder or palladium powder and the average particle diameter may be selected according to the size and characteristics of the target resistor to be used.

(Glass Components)

The glass components used for the ruthenium-oxide-containing glass in the thick film resistor paste of the present invention contain silicon oxide ($SiO_2$), lead oxide (PbO), and boron oxide ($B_2O_3$). In addition, magnesium oxide (MgO), calcium oxide (CaO), barium oxide (BaO), strontium oxide (SrO), cadmium oxide (CdO), tin oxide (SnO), zinc oxide (ZnO), bismuth oxide ($Bi_2O_3$) or the like may be included. Aluminum oxide ($Al_2O_3$) may also be included.

(Silicon Oxide: $SiO_2$)

$SiO_2$ is a base component of the glass components of the present invention, and the blending amount of $SiO_2$ is 3 mass % or more and 60 mass % or less relative to 100 mass % of the glass components contained in the ruthenium-oxide-containing glass. If the blending amount of $SiO_2$ is more than 60 mass %, the softening point of the glass to be formed becomes too high. In addition, if the blending amount of $SiO_2$ is less than 3 mass %, chemically stable glass cannot be obtained.

(Lead Oxide: PbO)

PbO has a function of lowering the softening point, and a function of promoting wetting with ruthenium oxide, improving dispersibility. The blending amount of PbO is 30 mass % or more and 90 mass % or less relative to 100 mass % of the glass components contained in the ruthenium-oxide-containing glass. If the blending amount of PbO is less than 30 mass %, the softening point of the glass to be formed becomes too high. In addition, if the blending amount of PbO is more than 90 mass %, it becomes difficult to obtain a chemically stable glass state.

(Boron Oxide: $B_2O_3$)

$B_2O_3$ is a base component of the glass components of the present invention, as well as $SiO_2$. And $B_2O_3$ has an effect of lowering the softening point of the glass to be formed. The blending amount of $B_2O_3$ is 5 mass % or more and 50 mass % or less relative to 100 mass % of the glass components contained in the ruthenium-oxide-containing glass. If the blending amount of $B_2O_3$ is less than 5 mass %, the toughness of the glass to be formed is reduced, cracks are likely to be generated, and the laser trimming property is reduced. In addition, if the blending amount of $B_2O_3$ is more than 50 mass %, the phase separation of the glass components is likely to occur, and the water resistance is also reduced.

(Combined Amount of Essential Glass Components)

The combined amount of $SiO_2$, PbO and $B_2O_3$ by mass % is 50 mass % or more relative to 100 mass % of the glass components contained in the ruthenium-oxide-containing glass. If the combined amount is less than 50 mass %, it is difficult to form the glass stably, and it becomes difficult to meet the surge resistance requirements of the electrical characteristics of the thick film resistor of the present invention.

(Other Glass Components)

In addition to the above essential glass components, oxides may be further added as glass components to improve various properties to the extent that they do not deteriorate the properties of the ruthenium-oxide-containing glass. Specifically, $Al_2O_3$, MgO, CaO, BaO, SrO, CdO, SnO, ZnO, $Bi_2O_3$ or the like can be contained. Each of the blending amount of these glass components is 20 mass % or less relative to 100 mass % of all the glass components contained in the ruthenium-oxide-containing glass.

(Ruthenium-Oxide-Containing Glass)

In the Ruthenium-oxide-containing glass used for the thick film resistor paste of the present invention, the blending ratios of the ruthenium oxide as the conductive substance and the glass components are, relative to 100 mass % of the ruthenium-oxide-containing glass composition, 10 mass % or more and 60 mass % or less of the conductive substance, and 40 mass % or more and 90 mass % or less of the glass components. If the mass % ratio of the ruthenium oxide is less than 10 mass %, the resistance value of the produced ruthenium-oxide-containing glass powder becomes too high and it shows almost no conductivity. In addition, if the mass % ratio of the ruthenium oxide is more than 60 mass %, the glass components cannot cover the ruthenium oxide powder, and the ruthenium-oxide-containing glass becomes brittle. By adjusting the blending ratio of the ruthenium oxide and the glass components, the resistance value of the thick film resistor is adjustable to the vicinity of the target resistance value.

The ruthenium-oxide-containing glass is milled so that the average particle diameter is less than 5 micrometers. If the average particle diameter is larger than 5 micrometers, the uniformity of the thick film resistor may decrease, the surge resistance may be reduced, and the cracks on the surface of the thick film resistor may be generated. So the average particle diameter is preferably not more than 5 micrometers. Ball mills, planetary mills, bead mills or the like may be used for the milling method.

In the present invention, the average particle diameter means the median diameter, and it is a numerical value measured using the particle diameter distribution meter using pure water solvent (HPA9320-10 0X, manufactured by Microtrac Bell Inc.), wherein the powder to be measured is dispersed ultrasonically in 2 g/L of aqueous sodium hexametaphosphate solution.

(Other Additives)

For the purpose of adjusting and improving the resistance value, TCR, and other characteristics of the thick film resistor, the thick film resistor paste of the present invention may further comprise borosilicate glass that does not contain conductive substances, and may further comprise additives commonly used. Dispersants may also be included as additives to improve dispersibility. Major additives include niobium oxide ($Nb_2O_5$), tantalum oxide ($Ta_2O_5$), titanium oxide ($TiO_2$), copper oxide (CuO), manganese oxide ($MnO_2$), zirconium oxide ($ZrO_2$), aluminum oxide ($Al_2O_3$) and others. The content amount of additives can be adjusted according to the desired improvement characteristics, but it is preferable that the content amount is 10 mass % or less relative to 100 mass % of the total inorganic material amount.

(Organic Vehicle)

There are no restrictions on the organic vehicle used for the thick film resistor pastes of the present invention, and resins such as ethyl cellulose and rosin dissolved in a solvent such as turpineol, that are used for general resistor pastes, may be used. The blending amount of the organic vehicle may be adjusted according to the printing method or the like. But in general, the blending amount of the organic vehicle should be between 20 mass % or more and 50 mass % or less relative to 100 mass % of the total amount of resistor paste.

(Method of Manufacturing Thick Film Resistor Paste)

Not specific but common three-roll mills, bead mills or the like can be used for the method of preparing the thick film resistor paste, the method comprising mixing the silver powder or the palladium powder, or the mixture powder of both the silver powder and the palladium powder, the ruthenium-oxide-containing glass and the organic vehicle, and further adding as needed the lead borosilicate glass powder and the additives or the like.

(Method of Manufacturing Thick Film Resistor)

The thick film resistor can be obtained by printing the preliminarily obtained thick film resistor paste on a ceramic substrate, removing an organic solvent by drying, and then sintering at a temperature of, for example, 800 to 900 degrees Celsius.

EMBODIED EXAMPLES

Hereinafter, the present invention will be explained more detail with reference to embodied examples, but the present invention is not limited to these examples.

Embodied Example 1: Evaluation of Resistor Having Area Resistance Value 10 Ohm

The ruthenium-oxide-containing glass was prepared by mixing at a ratio of 60 mass % of a glass material and 40 mass % of ruthenium oxide, melting and then cooling the mixture. The glass composition of the prepared conductive substance-containing glass is 33 mass % of $SiO_2$, 48 mass % of PbO, 5 mass % of $Al_2O_3$, 7 mass % of $B_2O_3$, 2 mass % of ZnO, and 5 mass % of CaO, relative to 100 mass % of glass components.

The obtained ruthenium-oxide-containing glass was pulverized with a ball mill so that the average particle diameter was about 1 micrometer. The thick film resistor paste of Embodied Example 1 was prepared by mixing the following thick film resistor composition in a three-roll mill so that the various inorganic materials were dispersed in the organic vehicle. The thick film resistor composition contained 28 mass % of the ruthenium-oxide-containing glass powder, 10 mass % of the lead borosilicate glass powder, 32 mass % of the palladium-coated silver powder having a mass ratio of palladium to silver being 30/70, each of 1 mass % of $Mn_2O_3$ and $Nb_2O_5$ as additives, and the rest was comprised of organic vehicle. The used lead borosilicate glass powder contained 33 mass % of $SiO_2$, 48 mass % of PbO, 5 mass % of $Al_2O_3$, 7 mass % of $B_2O_3$, 2 mass % of ZnO, and 5 mass % of CaO, relative to 100 mass % of glass components. For the organic vehicle, 20 mass parts of ethyl cellulose dissolved relative to 100 mass parts of turpineol was used. The composition of the thick film resistor paste of Embodied Example 1 and the composition of the ruthenium-oxide-containing glass used to produce the thick film resistor paste are shown in Table 1.

<Evaluation Test>

(Preparing of the Samples for Evaluation)

The prepared thick film resistor paste was printed at a width of 1.0 mm between five pairs of electrodes at an interval of 1.0 mm spacing, the electrodes being preliminarily formed on an alumina substrate, and dried in a belt furnace at a peak temperature of 150 degrees Celsius for five minutes. Then, the thick film resistor paste was sintered in a belt furnace at a peak temperature of 850 degrees Celsius for nine minutes. Five similarly processed samples were made in each of five units of alumina substrates to obtain 25 thick film resistors as evaluation samples 1.

In addition, by the same method as for the evaluation samples 1 except for printed between the electrodes at an interval of 0.3 mm spacing and at a width of 0.3 mm between the electrodes at intervals of 0.3 mm, one similarly processed sample was made in each of unit of alumina substrate to obtain five thick film resistors as evaluation samples 2.

(Film Thickness Measurement)

Regarding film thickness, after selecting an arbitrary alumina substrate unit among the evaluation samples 1, a stylus-type surface roughness meter was used to measure the film thicknesses of each of the five thick film resistors, and an average value of the measured film thicknesses at five points was used as an actual measured film thickness.

(Converted Area Resistance)

Resistance values of 25 evaluation samples 1 formed on five alumina substrates at 25 degrees Celsius were measured with a circuit meter (2001 MULTIMETER KEITHLEY INC.), and an average value was used as the actual measured resistance. The following equation (1) was used to calculate the converted area resistance when the film thickness was 7 micrometers. The calculated converted area resistance is shown in Table 3.

$$\text{Converted area resistance(kiloohm)} = \text{Measured resistance (kiloohm)} \times (\text{Measured film thickness (micrometer)}/7 \text{ (micrometer)}) \quad (1)$$

(Temperature Coefficient of Resistance: TCR)

The resistance values of the five thick film resistors of the evaluation samples 1 formed on one alumina substrate, were measured while holding in thermostatic chambers at minus 55 degrees Celsius, 25 degrees Celsius and at 125 degrees Celsius for 30 minutes, respectively. The measured resistance values were set to $R_{-55}$ $R_{25}$ and $R_{125}$, respectively. A low temperature TCR was calculated using the following equation (2) and a high temperature TCR was calculated using the following equation (3). The calculated average values of High temperature TCRs and Low temperature TCRs of the five points are shown in Table 3.

$$\text{Low temperature TCR(ppm/degrees Celsius)} = [(R_{-55} - R_{25})/R_{25}]/(-80) \times 10^6 \quad (2)$$

$$\text{High temperature TCR(ppm/degrees Celsius)} = [(R_{125} - R_{25})/R_{25}]/(100) \times 10^6 \quad (3)$$

(Evaluation of Surge Resistance: Resistance Value Change Rate)

An electrostatic discharge test was conducted on the thick film resistor of the evaluation samples 2 by applying a voltage under the condition of an electric capacity of 200 pF and an internal resistance of zero ohm, using a semiconductor device electrostatic tester (ESS-6008, Noise Research Labs). A voltage of 4 kV was applied to the thick film resistor of the evaluation samples 2 five times at one-second intervals, and the resistance value before the voltage application Rs and the resistance value after the voltage application Re were measured. Resistance value change rates were calculated using the following equation (4). The calculated average value of the resistance value change rates at five points is shown in Table 3.

$$\text{Resistance value change rate (\%)} = (Re - Rs)/Rs \times 100 \quad (4)$$

(Surface Observation of Thick Film Resistor)

Figure 1:
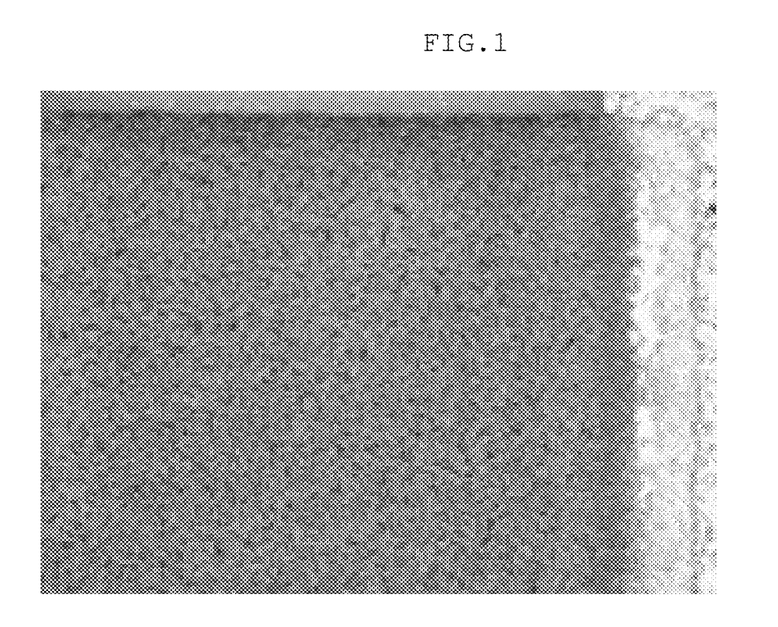
FIG. 1 is a metallographic micrograph of the resistor surface according to Embodied Example 1.

Surfaces of the thick film resistors of the evaluation samples 1 were observed by using metallurgical microscope. If the observed appearance of the surface was at the level wherein the fine voids partially existed due to sintering, the evaluation of observation was set to "O". On the other hand, if the observed appearance of the surface was at the level wherein the crack like defects existed due to multiple voids being connected or the like, the evaluation of observation was set to "X". The evaluation results are shown in Table 3, and the photographs of observed surface by metallurgical microscope are shown in FIG. 1.

Embodied Examples 2-12

Glass materials and ruthenium oxide were mixed and melted in the proportions shown in Table 1, respectively, and then cooled to produce conductive substance-containing glass. The glass compositions of each of the prepared ruthenium-oxide-containing glasses comprise $SiO_2$, PbO, $Al_2O_3$, $B_2O_3$, ZnO, and CaO, wherein the proportions of each content relative to 100 mass % of the glass components are shown in Table 1.

Each of the obtained ruthenium-oxide-containing glasses was pulverized with a ball mill to obtain the average particle diameter shown in Table 1. Each of the thick film resistor pastes of Embodied Examples 2 to 12 was prepared by mixing the thick film resistor composition that contained the ruthenium-oxide-containing glass powder, the lead borosilicate glass powder, the palladium-coated silver powder having a mass ratio of palladium to silver being 30/70, the additive, and the organic vehicle in the proportions shown in Table 1, in a three-roll mill so that the various inorganic materials were dispersed in the organic vehicle. The organic vehicles were the same composition used in Embodied Example 1. The lead borosilicate glass powders were the same composition used in Embodied Example 1.

Thick film resistors of the evaluation samples were also prepared in the same manner as in Embodied Example 1, and evaluated in the same manner as in Embodied Example 1. The results of each evaluation are shown in Table 3.

Comparative Example 1

A thick film resistor paste was prepared by the conventional manufacturing method in which conductive substances and glass were added in respective powder form, without using ruthenium-oxide-containing glass. However, if a ruthenium oxide powder and a glass powder were respectively added without using a ruthenium-oxide-containing glass powder that was obtained by grinding the ruthenium-oxide-containing glass, differences in electrical characteristics (TCR) or the like were occurred, in adjusting the resistance value suitable for the thick film resistor paste. Therefore, in Comparative Example 1 prepared by the conventional manufacturing method, to adjust TCR or the like, the lead ruthenate powder in addition to the ruthenium oxide powder were added as conductive substances, and combination amounts of ruthenium oxide powder, lead ruthenate powder, and palladium-coated silver powder of which mass ratio of palladium to silver was 30/70 or the like were adjusted. Namely, the thick film resistor composition comprising 20 mass % of ruthenium oxide powder, 5 mass % of lead ruthenate powder, 42 mass % of palladium-coated silver powder of which mass ratio of palladium to silver was 30/70, 30 mass % of glass powder, each of 1 mass % of $Mn_2O_3$ and $Nb_2O_5$ as additives, and the rest comprising organic vehicle were mixed to make the thick film resistor paste of Comparative Example 1 in a three-roll mill so that the various inorganic materials were dispersed in the organic vehicle. The glass composition in the prepared thick film resistor paste was, 33 mass % of $SiO_2$, 47 mass % of PbO, 5 mass % of $Al_2O_3$, 7 mass % of $B_2O_3$, 3 mass % of ZnO, and 5 mass % of CaO relative to 100 mass % of glass components. The organic vehicle used in Comparative Example 1 was the same composition as used in Embodied Example 1. The composition of the thick film resistor paste in Comparative Example 1 and the composition of glass used to prepare the thick film resistor paste are shown in Table 2.

Figure 2:
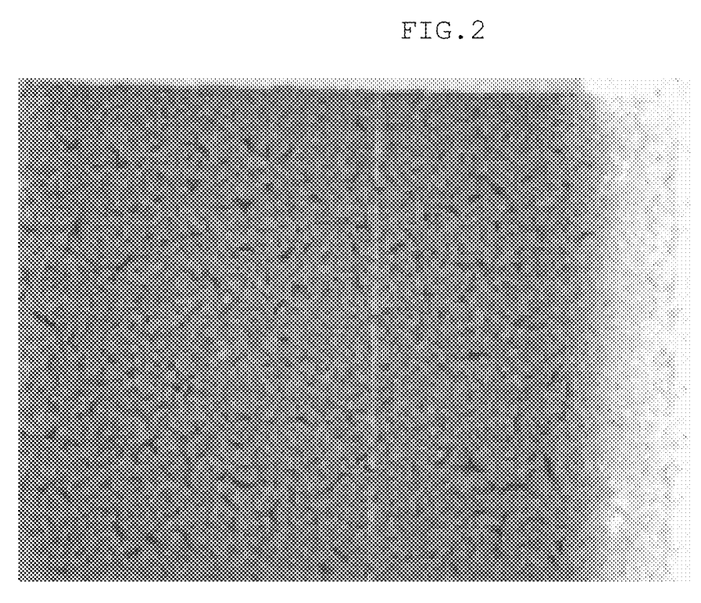
FIG. 2 is a metallographic micrograph of the resistor surface according to Comparative Example 1.

Thick film resistors of the evaluation samples were also prepared in the same manner as in Embodied Example 1, and evaluated in the same manner as in Embodied Example 1. The results of each evaluation are shown in Table 3, and the photographs of observed surface by metallurgical microscope are shown in FIG. 2.

Comparative Examples 2-10

Glass materials and ruthenium oxide were mixed and melted in the proportions shown in Table 1, respectively, and then cooled to produce ruthenium-oxide-containing glasses. The glass compositions of each of the prepared conductive substance-containing glasses comprise $SiO_2$, $PbO$, $Al_2O_3$, $B_2O_3$, $ZnO$, and $CaO$, wherein the proportions of each content relative to 100 mass % of the glass components are shown in Table 1.

Each of the obtained ruthenium-oxide-containing glasses was pulverized with a ball mill to obtain the average particle diameter shown in Table 1. Each of the thick film resistor pastes of Comparative Examples 2 to 10 was prepared by mixing the thick film resistor composition that contained the ruthenium-oxide-containing glass powder, the lead borosilicate glass powder, the palladium-coated silver powder having a mass ratio of palladium to silver being 30/70, the additive, and the organic vehicle in the proportions shown in Table 1, in a three-roll mill so that the various inorganic materials were dispersed in the organic vehicle. Each of the organic vehicles used in Comparative Examples 2 to 10 was the same composition as used in Embodied Example 1. Each of the lead borosilicate glass powders used in Comparative Examples 2 to 10 was the same composition as used in Embodied Example 1.

Thick film resistors of the evaluation samples were also prepared in the same manner as in Embodied Example 1, and evaluated in the same manner as in Embodied Example 1. The results of each evaluation are shown in Table 3.

TABLE 1

| | Composition of thick film resistor paste | | | | | | |
|---|---|---|---|---|---|---|---|
| | | Content amount of | | Content | Other additives | | Composition of |
| Embodied Examples and Comparative Examples | Content amount of silver or palladium powder, or mixture powder of both silver powder and palladium powder (wt %) | ruthenium-oxide-containing glass powder (wt %) | Content amount of organic vehicle (wt %) | amount of lead borosilicate glass powder (wt %) | Content amount of niobium oxide (wt %) | Content amount of manganese oxide (wt %) | ruthenium-oxide-containing glass ruthenium oxide Content amount of ruthenium oxide (wt %) |
| Embodied Example1 | 32 | 28 | 28 | 10 | 1 | 1 | 40 |
| Embodied Example2 | 32 | 28 | 28 | 10 | 1 | 1 | 10 |
| Embodied Example3 | 32 | 28 | 28 | 10 | 1 | 1 | 70 |
| Embodied Example4 | 32 | 28 | 28 | 10 | 1 | 1 | 40 |
| Embodied Example5 | 32 | 28 | 28 | 10 | 1 | 1 | 40 |
| Embosdied Example6 | 32 | 28 | 28 | 10 | 1 | 1 | 40 |
| Embodied Example7 | 32 | 28 | 28 | 10 | 1 | 1 | 40 |
| Embodied Example8 | 32 | 28 | 28 | 10 | 1 | 1 | 40 |
| Embodied Example9 | 32 | 28 | 28 | 10 | 1 | 1 | 40 |
| Embodied Example10 | 32 | 28 | 28 | 10 | 1 | 1 | 40 |
| Embodied Example11 | 32 | 28 | 28 | 10 | 1 | 1 | 40 |
| Embodied Example12 | 32 | 28 | 28 | 10 | 1 | 1 | 40 |
| Comparative Example1 | 25 | — | 33 | — | 1 | 1 | — |
| Comparative Example2 | 32 | 28 | 28 | 10 | 1 | 1 | 5 |
| Comparative Example3 | 32 | 28 | 28 | 10 | 1 | 1 | 75 |
| Comparative Example4 | 32 | 28 | 28 | 10 | 1 | 1 | 40 |
| Comparative Example5 | 32 | 28 | 28 | 10 | 1 | 1 | 40 |
| Comparative Example6 | 32 | 28 | 28 | 10 | 1 | 1 | 40 |
| Comparative Example7 | 32 | 28 | 28 | 10 | 1 | 1 | 40 |
| Comparative Example8 | 32 | 28 | 28 | 10 | 1 | 1 | 40 |
| Comparative Example9 | 32 | 28 | 28 | 10 | 1 | 1 | 40 |

TABLE 1-continued

| | | | | | | | |
|---|---|---|---|---|---|---|---|
| Comparative Example10 | 32 | 28 | 28 | 10 | 1 | 1 | 40 |

| | Composition of ruthenium-oxide-containing glass | | | | | | |
|---|---|---|---|---|---|---|---|
| | Glass components | | | | | | |
| | Essential glass components | | | Combined | Other glass components | | |
| Embodied Examples and Comparative Examples | Content amount of silicon oxide (wt %) | Content amount of lead oxide (wt %) | Content amount of boron oxide (wt %) | amount of these essential glass components (wt %) | Content amount of aluminium oxide (wt %) | Content amount of zinc oxide (wt %) | Content amount of calcium oxide (wt %) | Average particle diameter of the ruthenium-oxide-containing glass powder (micrometer) |
| Embodied Example1 | 33 | 48 | 7 | 88 | 5 | 2 | 5 | 1 |
| Embodied Example2 | 33 | 46 | 7 | 86 | 5 | 3 | 6 | 1 |
| Embodied Example3 | 33 | 46 | 7 | 86 | 5 | 3 | 6 | 1 |
| Embodied Example4 | 3 | 66.6 | 10.1 | 79.7 | 7.3 | 4.3 | 8.7 | 1 |
| Embodied Example5 | 60 | 30 | 5 | 95 | 1.8 | 1.2 | 2 | 1 |
| Embosdied Example6 | 42.8 | 30 | 9.1 | 81.9 | 6.5 | 3.8 | 7.8 | 1 |
| Embodied Example7 | 4 | 90 | 5 | 99 | 0.4 | 0.2 | 0.4 | 1 |
| Embodied Example8 | 33.7 | 47 | 5 | 85.7 | 5.1 | 3.1 | 6.1 | 1 |
| Embodied Example9 | 17.7 | 30 | 50 | 97.7 | 0.8 | 0.5 | 1 | 1 |
| Embodied Example10 | 15 | 30 | 5 | 50 | 17.9 | 12.1 | 20 | 1 |
| Embodied Example11 | 33 | 46 | 7 | 86 | 5 | 3 | 6 | 5 |
| Embodied Example12 | 33 | 46 | 7 | 86 | 5 | 3 | 6 | 6 |
| Comparative Example1 | — | — | — | — | — | — | — | — |
| Comparative Example2 | 33 | 48 | 7 | 98 | 5 | 2 | 5 | 1 |
| Comparative Example3 | 33 | 48 | 7 | 86 | 5 | 2 | 5 | 1 |
| Comparative Example4 | 1 | 70.2 | 11.2 | 86 | 7.3 | 3 | 7.3 | 1 |
| Comparative Example5 | 70 | 22 | 5 | 79.3 | 1.2 | 0.6 | 1.2 | 1 |
| Comparative Example6 | 46.4 | 20 | 9.6 | 93.7 | 10 | 4 | 10 | 1 |
| Comparative Example7 | 2 | 95 | 2 | 79.3 | 0.5 | — | 0.5 | 1 |
| Comparative Example8 | 34.1 | 49.5 | 3 | 98.7 | 5.7 | 2 | 5.7 | 1 |
| Comparative Example9 | 7 | 30 | 60 | 94 | 1.2 | 0.6 | 1.2 | 1 |
| Comparative Example10 | 5 | 30 | 5 | 40 | 22.5 | 15 | 22.5 | 1 |

*Each of the shown content amount (wt %) of silver powder or palladium powder or mixture powder of both silver powder and palladium powder, ruthenium-oxide-containing glass powder, organic vehicle, lead borocilicate glass powder, niobium oxide, and manganese oxide is relative to 100 wt % of the thick film resistor paste composition.

*The shown content amount (wt %) of ruthenium oxide is relative to 100 wt % of the ruthenium-oxide-containing glass composition.

*Each of the shown content amount (wt %) of silicon oxide, lead oxide, boron oxide, combined amount of these essential glass components, aluminum oxide, zinc oxide, and calcium oxide is relative to 100 wt % of the glass components.

TABLE 2

| Comparative Examples | Composition of thick film resistor paste |||||| 
|---|---|---|---|---|---|---|
| | Conductive substances |||| | |
| | Content amount of ruthenium oxide powder (wt %) | Content amount of lead ruthenate powder (wt %) | Content amount of palladium-coated silver powder (wt %) | Content amount of glass powder (wt %) | Content amount of organic vehicle (wt %) | Additives Content amount of niobium oxide (wt %) |
| Comparative Example1 | 15 | 5 | 25 | 20 | 33 | 1 |

| Comparative Examples | Composition of thick film resistor paste | Composition of glass |||||
|---|---|---|---|---|---|---|
| | Additives Content amount of manganese oxide (wt %) | Content amount of silicon oxide (wt %) | Content amount of lead oxide (wt %) | Content amount of boron oxide (wt %) | Content amount of aluminium oxide (wt %) | Content amount of zinc oxide (wt %) | Content amount of calcium oxide (wt %) |
| Comparative Example1 | 1 | 33 | 47 | 7 | 5 | 3 | 5 |

*Each of the shown content amount (wt %) of ruthenium oxide powder, lead ruthenate powder, palladium-coated silver powder, glass powder, organic vehicle, niobium oxide, and manganese oxide is relative to 100 wt % of the thick film resistor paste composition.
*Each of the shown content amount (wt %) of silicon oxide, lead oxide, boron oxide, aluminum oxide, zinc oxide, and calcium oxide is relative to 100 wt % of the glass components.

TABLE 3

| Embodied Examples and Comparative Examples | Converted area resistance (ohm) | Low temperature TCR (ppm/degrees Celsius) | High temperature TCR (ppm/degrees Celsius) | Resistance value change rate (%) | Surface observation |
|---|---|---|---|---|---|
| Embodied Example1 | 11.3 | −4 | 66 | −8 | ○ |
| Embodied Example2 | 58000 | −110 | −23 | −10 | ○ |
| Embodied Example3 | 5.8 | 18 | 80 | −7.2 | ○ |
| Embodied Example4 | 7.1 | 34 | 92 | −7.7 | ○ |
| Embodied Example5 | 23.4 | −87 | −15 | −9.1 | ○ |
| Embodied Example6 | 12.3 | −39 | 29 | −8.6 | ○ |
| Embodied Example7 | 25.4 | −103 | −29 | −8.7 | ○ |
| Embodied Example8 | 19.2 | −95 | −18 | −6.8 | ○ |
| Embodied Example9 | 8.8 | 2 | 67 | −8.1 | ○ |
| Embodied Example10 | 12.6 | −56 | 15 | −9.5 | ○ |
| Embodied Example11 | 13.9 | −33 | 36 | −10 | ○ |
| Embodied Example12 | 14.1 | −41 | 28 | −10.8 | ○ |
| Comparative Example1 | 10.1 | −67 | 15 | −12.6 | X |
| Comparative Example2 | >100M | — | — | — | — |
| Comparative Example3 | 5.3 | 25 | 88 | −9.1 | X |
| Comparative Example4 | 6.5 | 40 | 94 | −12.3 | ○ |
| Comparative Example5 | 20.1 | −101 | −25 | −13.2 | ○ |
| Comparative Example6 | 14.6 | −46 | 22 | −14 | ○ |
| Comparative Example7 | 18.8 | −110 | −28 | −12.9 | ○ |
| Comparative Example8 | 19.5 | −105 | −23 | −15 | ○ |
| Comparative Example9 | 8.6 | 14 | 78 | −12.8 | ○ |
| Comparative Example10 | 10.8 | −58 | 10 | −11.9 | ○ |

As shown in Table 3, the thick film resistors of Embodied Examples 1 to 12 were observed to reduce crack generations on the surfaces of the thick film resistors, to have low resistance value change rates before and after the electrostatic discharge tests, and to have excellent surge resistances, as compared with the thick film resistor of Comparative Example 1 formed by the conventional thick film resistor paste without using the ruthenium-oxide-containing glass powder. The thick film resistors of Embodied Examples 1 to 12 were formed by the thick film resistor pastes prepared by using the ruthenium-oxide-containing glass powders of the present invention.

The thick film resistor of Comparative Example 2 was observed to present almost no conductivity, because the resistance value of the conductive substance-containing glass powder became too high. The thick film resistor of Comparative Example 2 was formed by the thick film resistor paste obtained by using ruthenium-oxide-containing glass of which ruthenium oxide content were less than the claimed range of the present invention.

Furthermore, the thick film resistor of Comparative Example 3 was observed to have crack like defects on the surface. The thick film resistor of Comparative Example 3 was formed by the thick film resistor paste obtained by using ruthenium-oxide-containing glass of which content of ruthenium oxide was more than the claimed range of the present invention.

Furthermore, the thick film resistors of Comparative Examples 4 to 10 were observed to have higher resistance value change rates before and after the electrostatic discharge tests, and to have lower surge resistances, as compared with the thick film resistors of Embodied Examples 1 to 12. The thick film resistors of Comparative Example 4 to 10 were formed by the thick film resistor pastes made with the glass components whose content of silicon oxide or lead oxide, or the combined amount of these essential glass components were outside the claimed range of the present invention.

From the above test results, the thick film resistor formed by using the thick film resistor paste of the present invention is recognized to reduce crack generation and to have excellent surge resistance so as to be suitably used for electronic components which have been miniaturized in recent years.

The invention claimed is:

1. A thick film resistor paste containing a ruthenium-oxide-containing glass powder, characterized by comprising:
    a silver powder or a palladium powder, or a mixture of both of the silver powder and the palladium powder;
    a ruthenium-oxide-containing glass powder; and
    an organic vehicle,
        wherein the thick film resistor paste comprises 11.2 mass % or more and 16.8 mass % or less of the ruthenium oxide contained in the ruthenium oxide-containing glass powder relative to 100 mass % of the thick-film resistor paste composition containing the ruthenium oxide-containing glass powder;
    wherein the ruthenium-oxide-containing glass comprises 40 mass % or more and 60 mass % or less of the ruthenium oxide;
    wherein a glass composition of the ruthenium-oxide-containing glass comprises 33 mass % or more and 60 mass % or less of silicon oxide, 30 mass % or more and 48 mass % or less of lead oxide, and 5 mass % or more and 50 mass % or less of boron oxide relative to 100 mass % of glass components; and
    wherein a combined amount of silicon oxide, lead oxide and boron oxide in the ruthenium-oxide-containing glass by mass % is 81.9 mass % or more and 95 mass % or less relative to 100 mass % of the glass components.

2. The thick film resistor paste according to claim 1, wherein an average particle diameter of the ruthenium-oxide-containing glass powder is 5 micrometers or less.

3. A thick film resistor comprising a sintered body of the thick film resistor paste according to claim 1.

4. An electronic component provided with the thick film resistor according to claim 3.

5. A thick film resistor comprising a sintered body of the thick film resistor paste according to claim 2.

6. An electronic component provided with the thick film resistor according to claim 5.

* * * * *